United States Patent
Schrepfer

(10) Patent No.: US 7,501,784 B2
(45) Date of Patent: Mar. 10, 2009

(54) COMPENSATION METHOD AND APPARATUS FOR PREVENTING DAMAGING BEARING CURRENTS IN AN ELECTRICAL MACHINE

(75) Inventor: Armin Schrepfer, Grossenseebach (DE)

(73) Assignee: Siemens Aktiengesellschaft, München (DE)

( * ) Notice: Subject to any disclaimer, the term of this patent is extended or adjusted under 35 U.S.C. 154(b) by 145 days.

(21) Appl. No.: 10/599,674

(22) PCT Filed: Apr. 4, 2005

(86) PCT No.: PCT/EP2005/051502
§ 371 (c)(1),
(2), (4) Date: Oct. 5, 2006

(87) PCT Pub. No.: WO2005/099071
PCT Pub. Date: Oct. 20, 2005

(65) Prior Publication Data
US 2007/0182357 A1    Aug. 9, 2007

(30) Foreign Application Priority Data
Apr. 5, 2004   (DE)  ....................... 10 2004 016 738

(51) Int. Cl.
*H02K 5/16* (2006.01)
(52) U.S. Cl. .................. 318/632; 318/629; 327/551
(58) Field of Classification Search .................. 318/611, 318/620, 621, 623, 629, 632; 327/551–559; 363/39–48
See application file for complete search history.

(56) References Cited

U.S. PATENT DOCUMENTS

| | | | | |
|---|---|---|---|---|
| 5,936,856 | A  * | 8/1999 | Xiang | 363/98 |
| 6,775,157 | B2 * | 8/2004 | Honda | 363/39 |
| 2001/0045863 | A1* | 11/2001 | Pelly | 327/552 |
| 2004/0008527 | A1* | 1/2004 | Honda | 363/39 |
| 2004/0189115 | A1 | 9/2004 | Preisinger et al. | |
| 2006/0125335 | A1* | 6/2006 | Brauer | 310/68 R |
| 2006/0227483 | A1* | 10/2006 | Akagi | 361/118 |

FOREIGN PATENT DOCUMENTS

| | | |
|---|---|---|
| EP | 0 271 678 B1 | 1/1992 |
| JP | 60096150 | 5/1985 |
| JP | 10 014159 A | 1/1998 |

(Continued)

OTHER PUBLICATIONS

Schiferl R.F., Melfi M.J., Wang J.S.: Inverter Driven Induction Motor Bearing Current Solutions. In: Petroleum and chemical Industry Conference 2002, Applications Society 49th Annual, S. 67-75, 2002.

(Continued)

*Primary Examiner*—Bentsu Ro
(74) *Attorney, Agent, or Firm*—Henry M. Feiereisen; Ursula B. Day

(57) ABSTRACT

In an apparatus to increase the service life of bearings in an electric machine, the bearing currents that act on the bearings of the rotor are reduced by the application of a corresponding negative field voltage to the rotor, obtained with the aid of a compensation unit. The reduction of the bearing currents prevents ripple formation in the bearing and increased ageing of the lubricant.

26 Claims, 5 Drawing Sheets

FOREIGN PATENT DOCUMENTS

WO    WO 2004/001927 A2    12/2003

OTHER PUBLICATIONS

Chen S., Lipot T., Fitzgerald D.: Modeling of Motor Bearing Currents in PWM Inverter Drives. In: IEEE Transactions on Industry Applications, vol. 32, No. 6, Nov./Dec. 1996, S. 1365-1370, 1996.

Rockwell Automation: Industry White Paper—Inverter-Driven Induction Motors Shaft and Bearing Current Solutions Mar. 11, 2002, S. 24-25, 2002.

Chenggang Mei et al.: Minimization and cancellation of common-mode currents, shaft voltages and bearing currents for induction motor drives, vol. 4 of 4, Conf. 34, Jun. 15, 2003; pp. 1127-1132.

* cited by examiner

COMPENSATION METHOD AND APPARATUS FOR PREVENTING DAMAGING BEARING CURRENTS IN AN ELECTRICAL MACHINE

BACKGROUND OF THE INVENTION

The present invention relates to a compensation apparatus in order to compensate for bearing currents in an electrical machine, and to an electrical machine which is equipped with a compensation apparatus such as this. The present invention furthermore relates to a corresponding method for compensation for bearing currents.

Nowadays, variable-speed motors are generally fed by voltage intermediate-circuit converters. These voltage-intermediate-circuit converters for feed purposes lead to bearing currents in the bearings of the motor. These bearing currents can lead to premature failure of the bearings, depending on the design of the motor. Failure is due to groove formation on the running suhigh-frequencyaces of the bearing (vibration, noise) and/or to decomposition of the bearing grease.

Current-isolated bearings, for example bearings with ceramic insulation on the outer ring, are thus widely used in order to suppress bearing currents. Alternatively, hybrid bearings have been used, with steel rings and ceramic roller bodies in order to avoid bearing currents. However, these bearings are very expensive and are thus avoided, as far as possible. Furthermore, solutions in which the rotor is grounded by means of grounding brushes are known in order to prevent bearing currents. However, the grounding brushes are subject to wear and the contact reliability is not ensured, particularly in rugged environmental conditions. Furthermore, the Rockwell company have proposed in an "Industry White Paper" entitled "Inverter-Driven Induction Motors Shaft and Bearing Current Solutions" for a specific shield to be provided between the rotor and the stator. Furthermore, in this context, converters are also known which use specific pulse patterns to reduce the bearing currents. All of these solutions have the common feature that they are relatively expensive and complex.

SUMMARY OF THE INVENTION.

The object of the present invention is thus to propose an electrical machine in which the problems relating to bearing currents are solved in a simple manner. A further aim is to specify a corresponding method.

According to the invention, this object is achieved by a compensation apparatus for compensation for bearing currents in an electrical machine having a connection device for connection to at least one winding, to the housing and to the rotor of the electrical machine, and a voltage production device for production of a compensation voltage for the rotor of the electrical machine as a function of the operating voltage which is applied to the at least one winding, of the electrical machine.

Furthermore a method is provided according to the present invention for compensation for bearing currents in an electrical machine by production of a compensation voltage for the rotor of the electrical machine as a function of an operating voltage of the electrical machine, and application of the compensation voltage to the rotor of the electrical machine.

The compensation apparatus according to the invention, which is of simple design, applies an appropriate opposing voltage to the bearing, so that the electrical voltage which is caused on the bearings by the normal operating voltage on the electrical machine is compensated for. Currents therefore no longer flow via the bearing, and the life of the electrical machine can be correspondingly increased.

The voltage production device of the compensation apparatus according to the invention preferably has a transformer whose primary winding is connected between the at least one winding and the housing of the electrical machine, and whose secondary winding is connected between the rotor and the housing of the electrical machine. The transformer represents a cost-effective passive element for provision of the compensation.

The transformer can be connected to networks, for example RC combinations, varistors, in order to adjust the compensation voltage individually for the machine.

As an alternative to the transformer, the voltage production device may have an active circuit, by means of which the compensation voltage can be produced from the operating voltage which is applied to the electrical machine. An active circuit such as this makes it possible to carry out even more exact compensation.

The operating voltage of the electrical machine frequently includes a common-mode voltage, which is a significant cause of bearing currents. It is thus advantageous to use the common-mode voltage as an input variable for the voltage production device. The bearing voltages are generally dependent on the common-mode voltage only via a motor-specific transformation ratio..

In one particular embodiment, the compensation apparatus according to the invention has a star circuit by means of which the phases of the electrical machine are connected at a star point, and in which the voltage at the star point is used as an input voltage for the voltage production device. This synthetically created star point means that there is no need to connect the windings of the machine at a star point, or for the star point to be accessible in the machine.

A three-phase electrical machine is preferably equipped with the compensation apparatus. In this case, as already mentioned, it is particularly advantageous for a star point to be provided in the machine and for it to be possible to tap off the voltage at the star point as an input voltage for the voltage production device. This means that there is no need for a synthetic star point for production of the compensation voltage.

The object mentioned above is also achieved by a compensation apparatus for prevention of damaging bearing currents having a first connection for connection to the rotor of an electrical machine, a second connection for connection to the housing or a potential of a voltage intermediate-circuit converter of the electrical machine, and an impedance with a low high-frequency reactance, which impedance is connected between the first and the second connection. An electrical machine according to the invention can be equipped with a compensation apparatus such as this. In this case, the idea is to ground the rotor via the compensation apparatus by only high frequencies. This makes it possible to avoid EDM bearing currents, that is to say the supply voltage for the motor is not used in this case.

BRIEF DESCRIPTION OF THE DRAWINGS

The present invention will now be explained in more detail with reference to the attached drawings, in which.

DETAILED DESCRIPTION OF PREFERRED EMBODIMENTS

The exemplary embodiments which are described in more detail in the following text represent preferred embodiments of the present invention.

Figure 1:
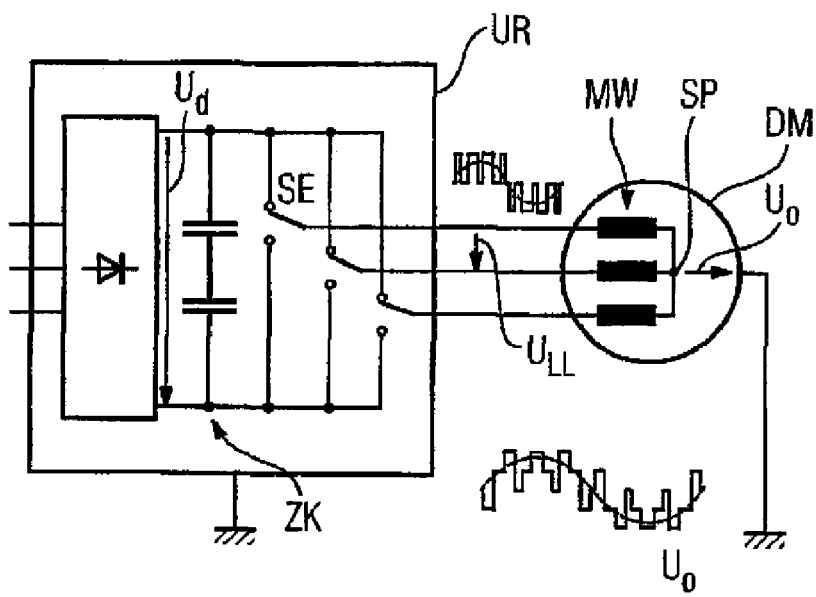
FIG. 1 shows a circuit diagram of a motor which is supplied with a voltage intermediate-circuit converter in a two-point circuit.

The reason for the converter-dependent bearing currents is the so-called "common-mode voltage" in the pulse pattern of the voltage intermediate-circuit converter UR, which is illustrated in FIG. 1. The common-mode voltage $U_0$ which is applied to the motor DM can be measured directly, for example, between the star point and the motor housing if the motor windings are connected in star. The electronic switching elements SE in the voltage intermediate-circuit converter UR switch the voltage $U_d$ of the intermediate circuit ZK to the motor windings MW using a control method. A distinction is drawn between so-called on-line and off-line control methods. Irrespective of the control method that is used, the basic voltage waveform $U_0$ at the star point SP is as shown in FIG. 1. This voltage waveform results from the voltages $U_{LL}$, which are likewise shown in FIG. 1, between the phases.

Figure 2:
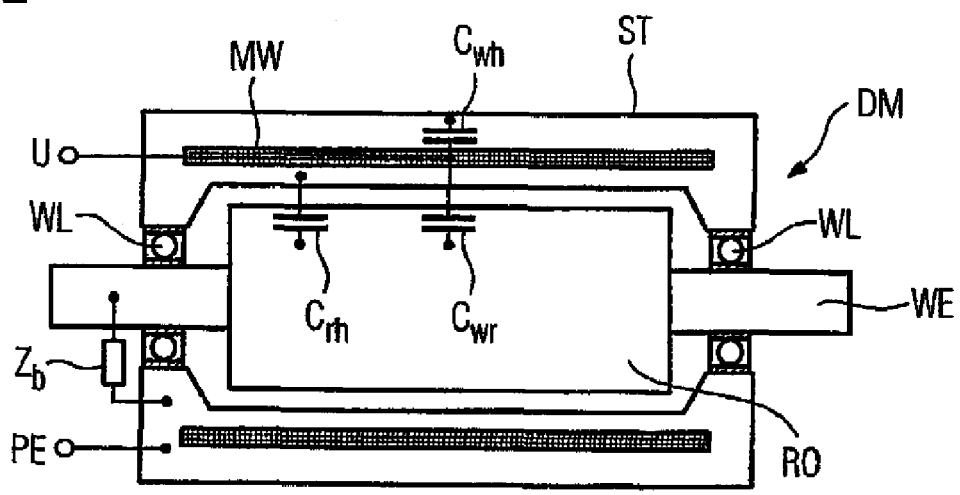
FIG. 2 shows a section drawing through a motor.

Switching the electronic switching elements SE on and off leads to a change in the voltage across the parasitic capacitances in the motor, and thus to a current flow. FIG. 2 shows these parasitic capacitances in a three-phase motor DM which has a stator ST and a rotor RO. The shaft WE of the rotor RO is borne on the stator ST via, for example, roller bearings WL. The voltage U is applied to the windings WI of the stator ST.

This motor design (see also FIG. 3) leads to a capacitance $C_{wh}$ between the motor winding and the motor housing, a capacitance $C_{wr}$ between the motor winding and rotor, a capacitance $C_{rh}$ between the rotor and the motor housing, an effective capacitance $C_b$ between the roller bodies and the bearing rings, a non-linear impedance $Z_n$ of the lubricating film and an effective resistance $R_b$ of the bearing comprising bearing rings and roller bodies.

Figure 3:
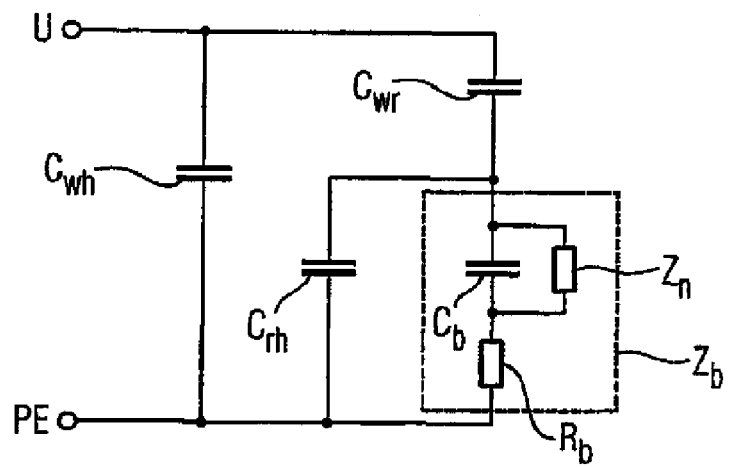
FIG. 3 shows a single-phase equivalent circuit of the motor shown in FIG. 2.

These electrical variables result in the single-phase equivalent circuit of a three-phase motor, as shown in FIG. 3, including the electrical equivalent circuit for the impedance $Z_b$ of the roller bearing WL. On this basis, the capacitance $C_{wh}$ is connected between the phase U and ground PE. A series circuit formed by the capacitances $C_{wr}$ and $C_{rh}$ is arranged in parallel with this capacitance $C_{wh}$. The bearing impedance $Z_b$ is once again connected in parallel with the capacitance $C_{rh}$. This bearing impedance $Z_b$ comprises a parallel circuit formed by the capacitance $C_b$ and the lubricating film impedance $Z_n$, which is connected in series with the bearing resistance $R_b$.

Figure 4:
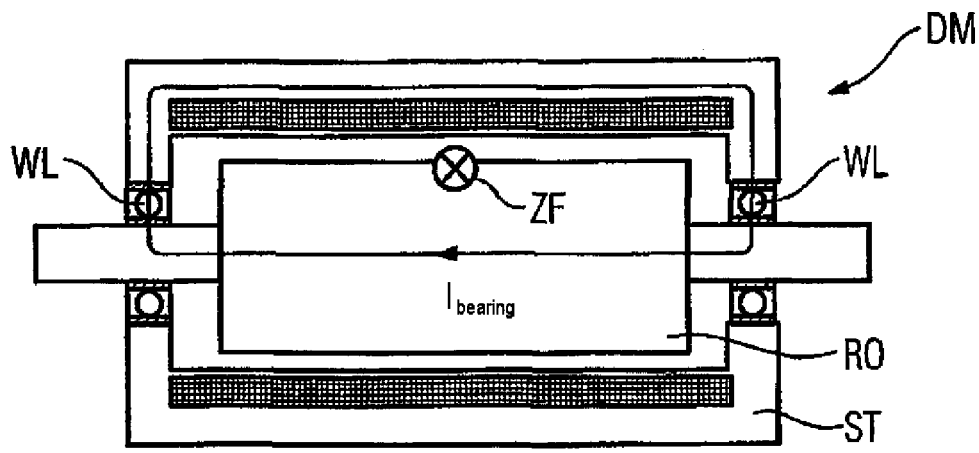
FIG. 4 shows an illustration of a circular flow and of a bearing current.

A change in the common-mode voltage $U_o$ produces a current flow through the capacitance $C_{wh}$. This current results in a circular flow ZF in the motor windings MW which can lead to a damaging bearing current $I_{bearing}$, as is indicated in FIG. 4. The bearing current $I_{bearing}$ passes through the laminated stator core of the stator ST, through the roller bearings WL through the rotor RO and, at the other end face of the three-phase motor DM, back through the roller bearing WL to the stator ST.

Figure 5:
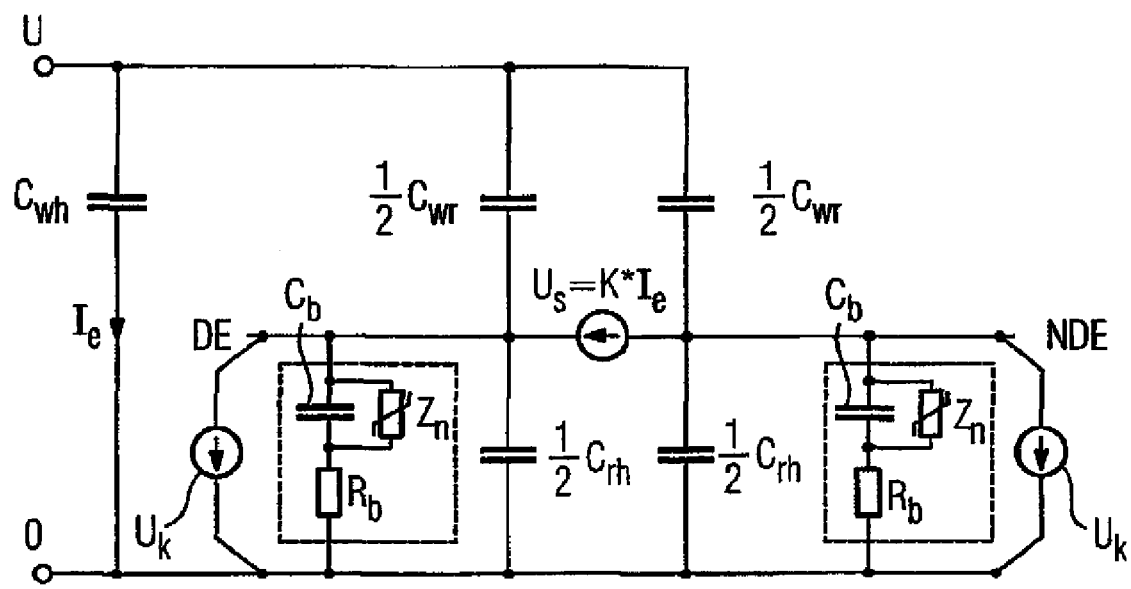
FIG. 5 shows an electrical equivalent circuit in order to explain the bearing current caused by circular flow.

The current $I_e$ illustrated in FIG. 5 through the capacitance $C_{wh}$ is the source of the shaft voltage $U_s$. The shaft voltage $U_s$ and the current $I_e$ are transformer-linked by the design of the motor. The shaft voltage $U_s$ is split between the two motor bearings. The equivalent circuits for the roller bearings at the drive end DE and at the non-drive end NDE of the motor are shown appropriately in FIG. 5.

The lubricating film in the roller bearing can provide isolation only for a specific voltage, and then breaks down. A damaging bearing current can now be formed. The breakdown voltage is dependent on the lubricating film thickness and thus on the rotation speed, the temperature and the load on the bearing. The breakdown voltage is in the range 0.3 . . . 35 V. Bearing currents such as these have been described in the article by S. Chen, T. A. Lipo, D. Fitzgerald, "Modelling of bearing currents in inverter drives", IEEE Transactions on Industry Applications, volume 32, pages 21-31, 1996.

According to the invention, the voltage across the roller bearings can be kept to values below the breakdown voltage by means of a suitable opposing voltage $U_k$. This prevents the described bearing current caused by the circular flow. A current caused by the circular flow now flows via the compensation apparatuses (FIG. 5).

Figure 6:
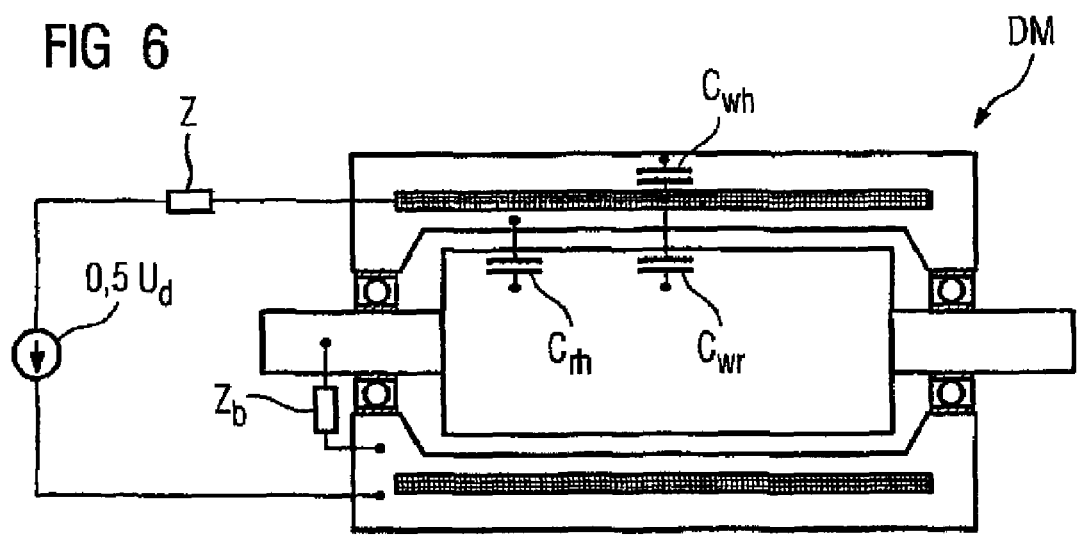
FIG. 6 shows the motor from FIG. 2 with electrical circuitry.

Damaging bearing currents may also be caused by discharge effects. In this case (see FIG. 6 and FIG. 7), the capacitance of the roller bearing $C_b$ is charged via the capacitive voltage divider comprising $C_{wr}$, $C_{rh}$, and $G_b$ for as long as the lubricating film can provide isolation for this voltage. On reaching the breakdown voltage, the capacitance $C_b$ is short-circuited within the bearing, and the capacitance $C_b$, is discharged into this short-circuit. As long as the lubricating film provides isolation, the voltage across the bearing is an image of the common-mode voltage corresponding to the transformation ratio BVR (bearing voltage ratio), which is predetermined by the motor design.

Figure 7:
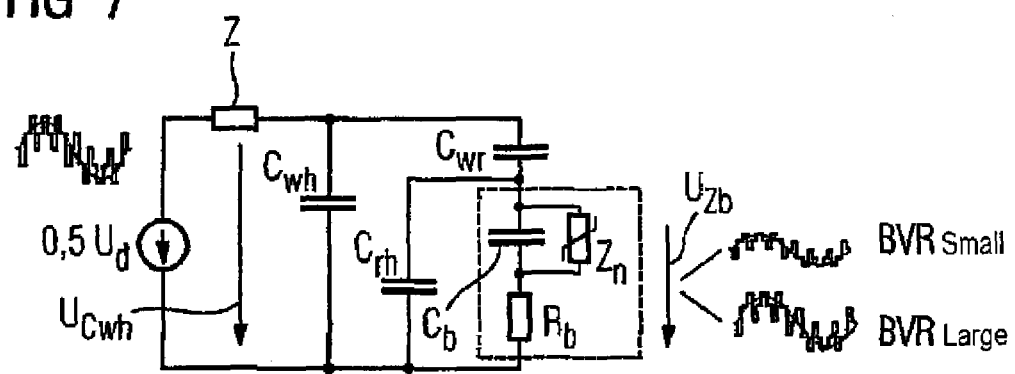
FIG. 7 shows the equivalent circuit, corresponding to the circuitry in FIG. 6, with bearing current signal forms.

The transformation ratio BVR is governed by the ratio of the voltage $U_{Zb}$ across the bearing impedance $Z_b$ and the voltage $U_{Cwh}$ across the capacitance $C_{wh}$. This ratio is typically between 0.02 and 0.2 . FIG. 7 shows the voltage waveform $U_{Zb}$ for a small value of BVR and for a large value of BVR. In this case, the circuit and the motor winding are supplied with half the intermediate-circuit voltage $0.5\,U_d$ via an impedance Z, with this voltage having the same signal waveform as the voltage $U_{Zb}$. In this case as well, charging of the bearing can be prevented by a suitable opposing voltage $U_k$.

Figure 8:
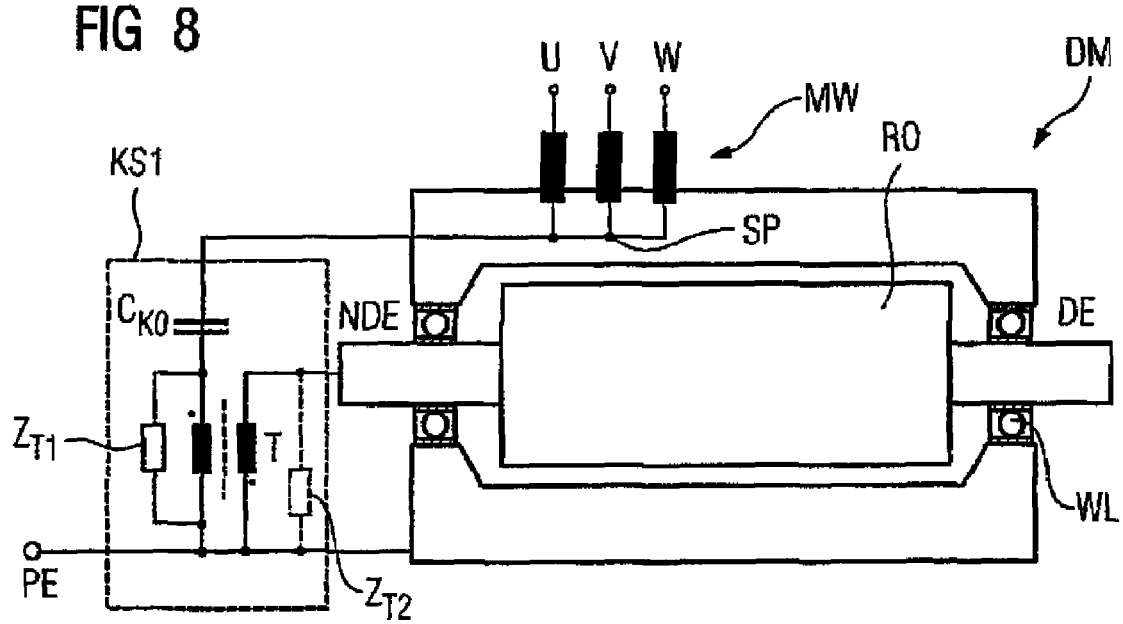
FIG. 8 shows the circuitry according to the invention of a motor with a compensation apparatus which is connected to the star point of the motor winding.
Figure 9:
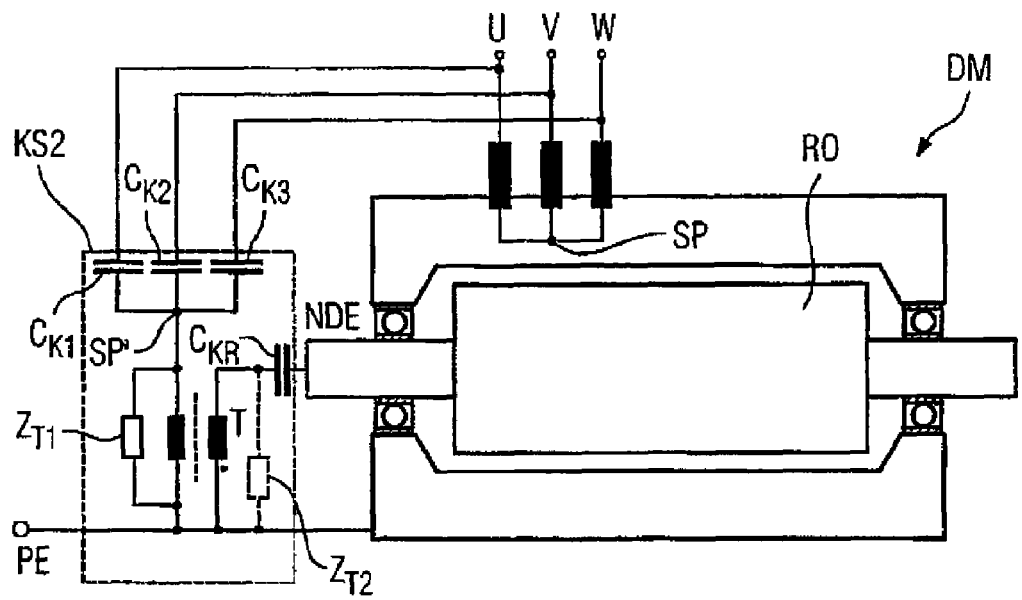
FIG. 9 shows the circuitry of a motor with a compensation apparatus, in which the star point of the motor is not accessible.

A circuit KS1 or KS2 (see FIG. 8 or FIG. 9 respectively) according to the invention is used to compensate for the bearing voltage $U_{Zb}$ produced by the common-mode voltage $U_o$. The common-mode voltage $U_o$ connected to the motor terminals is either used directly (FIG. 8) or is modeled (FIG. 9) for this purpose. The compensation circuit KS1 or KS2 uses the common-mode voltage $U_o$ to produce an opposing voltage in order to minimize the bearing currents. It may be designed using passive or active components. It is injected at the drive end (DE) or at the non-drive end (NDE) depending on the design of the motor DM, in order to produce the desired compensation. The compensation voltage or opposing voltage can also be injected capacitively by means of a capacitor $C_{KR}$ (FIG. 9).

The respective compensation device KS1 or KS2 is, in its simplest form, a pulse transformer or transformer T which applies the common-mode voltage $U_o$ with an appropriate mathematical sign to the rotor RO as the opposing voltage, corresponding to the BVR of the motor. The common-mode voltage $U_o$ reaches up to half the intermediate-circuit voltage $U_d$ with conventional voltage intermediate-circuit converters. If, for example, the BVR is 5% and the common-mode voltage $U_o$ is 300 V, the opposing voltage that must be produced is 15 V. The opposing voltage may be applied to the rotor RO via a sliding contact or via a capacitive coupling device.

The pulse transformer T is provided with circuitry networks $Z_{T1}$, $Z_{T2}$ in order to match the voltage form to the opposing voltage. This circuitry $Z_{T1}$, $Z_{T2}$ may, for example, be an RC combination and/or a varistor.

The pulse transformer T is fed via one or more coupling capacitors. If the common-mode voltage $U_o$ is available at the star point SP (see FIG. 8), only one coupling capacitor $C_{KO}$ is required, and is connected to the star point SP of the motor winding MW. If this star point SP is not available (see FIG. 9), for example in the case of a delta-connected winding, the coupling capacitors $C_{K1}$, $C_{K2}$, $C_{K3}$ are connected to the motor terminals U, V, W. The three coupling capacitors $C_{K1}$, $C_{K2}$, $C_{K3}$ form a star point SP', at which the common-mode voltage $U_o$ is formed.

Figure 10:
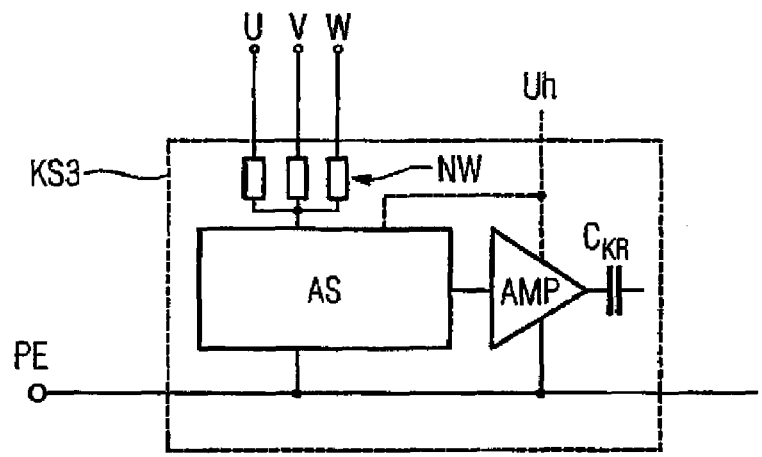
FIG. 10 shows a circuit diagram of a compensation apparatus with active components.

As shown in FIG. 10, the compensation apparatus KS3 can also be designed with active components, and if required digitally. The auxiliary energy Uh for supplying the active circuit AS can be obtained from the motor voltage, or can be provided externally. The common-mode voltage $U_o$ is either recorded directly or is obtained via a network NW or from the drive signals of the voltage intermediate-circuit converter UR. An opposing voltage is determined from the common-mode voltage $U_o$ and from the motor data, and is passed to the rotor via an amplifier AMP and the coupling device $C_{KR}$.

The active circuit (AS) can also be designed such that the compensation apparatus KS3 provides a high-frequency ground for the rotor, irrespective of the common-mode voltage $U_o$.

Figure 11:
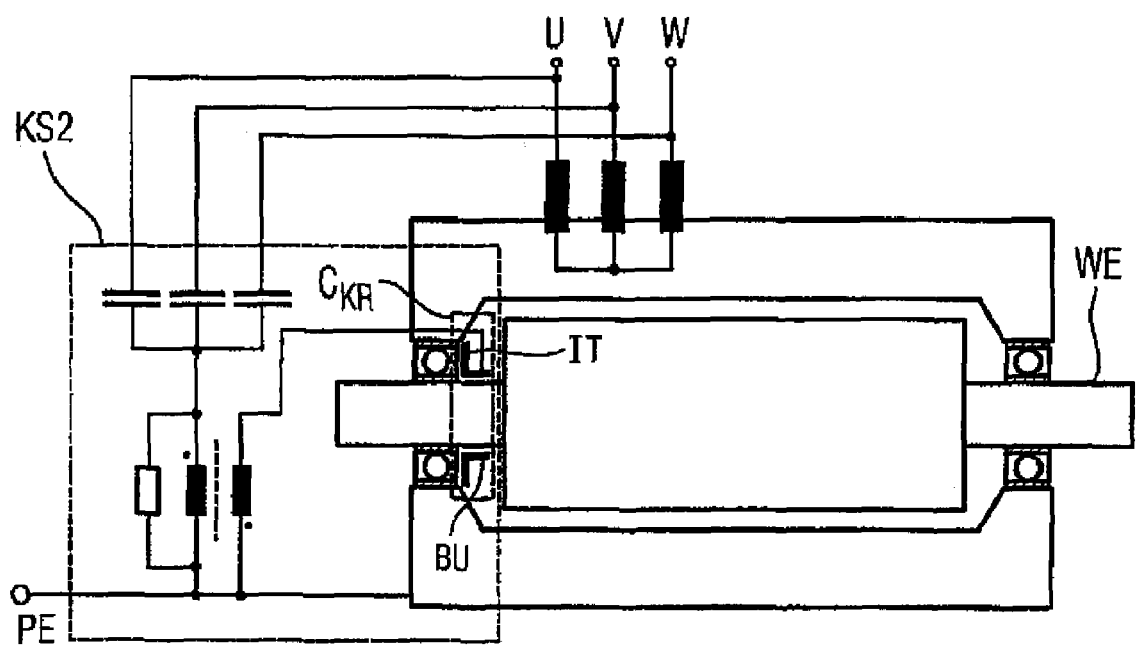
FIG. 11 shows one example of a coupling device for coupling the compensation voltage to the rotor.

A sliding contact is avoided, in order to connect the opposing voltage to the rotor reliably and without wear. FIG. 11 shows one implementation option for the coupling device $C_{KR}$. In this case, a bush BU is plugged over the rotor shaft WE, and is centered with an isolating part IT. The bush BU together with the rotor shaft WE forms a cylindrical capacitor.

The bush BU and the isolating part IT may also, for example, be in the form of one component, which is mounted in the same way as a bearing.

No expensive current-isolating bearings or hybrid bearings for the prevention of damaging bearing currents are required when using the compensation apparatus KS1 to KS3 according to the invention. The life of the bearing is then advantageously increased, without the bearing currents, owing to the lack of groove formation or reduced grease aging.

What is claimed is:

1. A compensation apparatus for prevention of damaging bearing currents in an electrical machine having at least one winding, a housing and a rotor, said apparatus comprising:
    a connection device adapted adapted to connect to at least one winding, to the housing and to the rotor of the electrical machine; and
    a voltage production device adapted to produce a compensation voltage for the rotor of the electrical machine as a function of an operating voltage which is applied to the at least one winding of the electrical machine.

2. The compensation apparatus of claim 1, wherein the operating voltage applied to the winding is obtained from drive signals of a voltage intermediate-circuit converter of the electrical machine.

3. The compensation apparatus of claim 1, further comprising a transformer in the voltage production device, said transformer having a primary winding connected between the at least one winding and the housing of the electrical machine, and having a secondary winding connected between the rotor and the housing of the electrical machine.

4. The compensation apparatus of claim 3, further comprising a network for adaptation of the compensation voltage, said network being connected in parallel with the primary winding.

5. The compensation apparatus of claim 3, wherein the voltage production device has an active circuit to produce the compensation voltage from the operating voltage applied to the electrical machine.

6. The compensation apparatus of claim 3, further comprising a network, connected in parallel with the secondary winding, for adaptation of the compensation voltage.

7. The compensation apparatus of claim 1, further comprising a star circuit adapted to connect phases of the electrical machine at a star point; and a star point voltage at the star point, said star point being connected to provide the star point voltage as an input voltage for the voltage production device.

8. An electrical machine having a compensation apparatus for prevention of damaging bearing currents in an electrical machine, said compensation apparatus comprising:
    a connection device adapted to connect to at least one winding, to the housing and to the rotor of the electrical machine; and
    a voltage production device adapted to produce a compensation voltage for the rotor of the electrical machine as a function of an operating voltage applied to the at least one winding of the electrical machine.

9. The electrical machine of claim 8, constructed as a three-phase electrical machine.

10. The electrical machine of claim 8, further comprising a star circuit adapted to connect the winding of the electrical machine at a star point; and a star point voltage at the star point, said star point being connected to provide the star point voltage as an input voltage for the voltage production device.

11. The electrical machine of claim 8, wherein the operating voltage applied to the winding is obtained from drive signals of a voltage intermediate-circuit converter of the electrical machine.

12. The electrical machine of claim 8, wherein the compensation apparatus includes a transformer in the voltage production device, said transformer having a primary winding connected between the at least one winding and the housing of the electrical machine, and having a secondary winding connected between the rotor and the housing of the electrical machine.

13. The electrical machine of claim 12, wherein the compensation apparatus includes a network, connected in parallel with the primary winding, for adaptation of the compensation voltage.

14. The electrical machine of claim 12, wherein the compensation apparatus includes a network, connected in parallel with the secondary winding, for adaptation of said compensation voltage.

15. The electrical machine of claim 8, wherein the compensation apparatus includes an active circuit in the voltage production device, said active circuit being adapted to produce the compensation voltage from the operating voltage applied to the electrical machine.

16. The electrical machine of claim 8, wherein the compensation apparatus includes a star circuit adapted to connect phases of the electrical machine at a star point, and a star point voltage at the star point, said star point being connected to provide the star point voltage as an input voltage for the voltage production device.

17. A method for compensating bearing currents in an electrical machine, comprising the steps of:
   producing a compensation voltage for a rotor of the electrical machine as a function of an operating voltage of the electrical machine, and
   applying the compensation voltage to the rotor of the electrical machine.

18. The method of claim 17, wherein the compensation voltage is produced by a transformer which transforms a primary voltage applied to at least one winding of the electrical machine for the compensation voltage.

19. The method of claim 17, wherein the compensation voltage is produced by an active circuit.

20. The method of claim 17, wherein the operating voltage of the electrical machine is a common-mode voltage.

21. The method of claim 17, wherein the electrical machine is operated with three phases.

22. The method of claim 21, wherein windings of the electrical machine are interconnected at a star point, and the voltage at the star point is used to produce the compensation voltage.

23. A compensation apparatus for prevention of damaging bearing currents, comprising:
   a first connection adapted to be connected to a rotor of an electrical machine;
   a second connection adapted to be connected to a housing of the electrical machine; and
   an impedance having a DC resistance and a high frequency reactance which is less than said DC resistance, said impedance being connected between the first connection and the second connection.

24. An electrical machine having a compensation apparatus for prevention of damaging bearing currents in an electrical machine, said compensation apparatus comprising:
   a first connection adapted to be connected to a rotor of the electrical machine;
   a second connection adapted to be connected to a housing of the electrical machine; and
   an impedance having a DC resistance and a high frequency reactance which is less than the DC resistance, said impedance being connected between the first connection and the second connection.

25. A compensation apparatus for prevention of damaging bearing currents in an electrical machine, comprising:
   a first connection adapted to be connected to a rotor of an electrical machine;
   a second connection adapted to be connected to a potential of a voltage intermediate-circuit converter of the electrical machine; and
   an impedance having a DC resistance and a high frequency reactance that is less than said DC resistance, said impedance being connected between said first connection and said second connection.

26. An electrical machine having a compensation apparatus for prevention of damaging bearing currents in an electrical machine, said compensation apparatus comprising:
   a first connection adapted to be connected to a rotor of the electrical machine;
   a second connection adapted to be connected to a potential of a voltage intermediate-circuit converter of the electrical machine; and
   an impedance having a DC resistance and a high frequency reactance that is less than said DC resistance, said impedance being connected between said first connection and said second connection.

* * * * *